United States Patent
Guo et al.

(10) Patent No.: US 11,994,790 B2
(45) Date of Patent: May 28, 2024

(54) TRANSPARENT DISPLAY PANEL AND CONTROL METHOD AND APPARATUS THEREFOR, DISPLAY APPARATUS, AND DISPLAY SYSTEM

(71) Applicants: BEIJING BOE DISPLAY TECHNOLOGY CO., LTD., Beijing (CN); BOE TECHNOLOGY GROUP CO., LTD., Beijing (CN)

(72) Inventors: Luqiang Guo, Beijing (CN); Tingting Luo, Beijing (CN); Guangyun Tong, Beijing (CN); Shou Li, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 128 days.

(21) Appl. No.: 17/762,999

(22) PCT Filed: May 12, 2021

(86) PCT No.: PCT/CN2021/093248
§ 371 (c)(1),
(2) Date: Mar. 23, 2022

(87) PCT Pub. No.: WO2022/001384
PCT Pub. Date: Jan. 6, 2022

(65) Prior Publication Data
US 2022/0350230 A1    Nov. 3, 2022

(30) Foreign Application Priority Data

Jun. 30, 2020  (CN) .......................... 202010611244.9

(51) Int. Cl.
G03B 21/00    (2006.01)
G02F 1/133    (2006.01)
(Continued)

(52) U.S. Cl.
CPC ....... *G03B 21/006* (2013.01); *G02F 1/13312* (2021.01); *G02F 1/133504* (2013.01);
(Continued)

(58) Field of Classification Search
CPC .............................................. G02B 2027/0118
See application file for complete search history.

(56) References Cited

U.S. PATENT DOCUMENTS

2008/0048932 A1* 2/2008 Yanagisawa ........... G01C 21/36
345/9
2015/0362779 A1* 12/2015 Chen .................... G02F 1/13363
445/24
(Continued)

FOREIGN PATENT DOCUMENTS

CN    201444232 U    4/2010
CN    103489412 A    1/2014
(Continued)

Primary Examiner — Alexander P Gross
(74) Attorney, Agent, or Firm — The Webb Law Firm

(57) ABSTRACT

A transparent display panel and a control method and apparatus therefor, a display system, and a computer-readable storage medium. The transparent display panel includes: a liquid crystal panel (11), and a transflective optical film layer (12) disposed on one side of the liquid crystal panel (11), wherein a plurality of microstructures (31) for scattering incident light rays are provided in the transflective optical film layer (12), in order to present a projected image. The transparency level of the transparent display panel is determined by acquiring the ambient light intensity of the transparent display panel or a grayscale average of a projected image at each first region, and the light transmittance level of the liquid crystal panel is adjusted according to the transparency level, thereby improving the projection display effect.

15 Claims, 6 Drawing Sheets

(51) Int. Cl.
*G02F 1/1335* (2006.01)
*G02F 1/1343* (2006.01)
*G02F 1/1362* (2006.01)
*G02F 1/137* (2006.01)
*G03B 21/56* (2006.01)

(52) U.S. Cl.
CPC .. *G02F 1/133528* (2013.01); *G02F 1/134309* (2013.01); *G02F 1/136222* (2021.01); *G02F 1/137* (2013.01); *G03B 21/56* (2013.01); *G02F 2203/01* (2013.01); *G02F 2203/09* (2013.01); *G02F 2203/30* (2013.01)

(56) References Cited

U.S. PATENT DOCUMENTS

| | | | | |
|---|---|---|---|---|
| 2015/0370075 | A1* | 12/2015 | Ato | G02B 27/0172 359/240 |
| 2018/0088323 | A1* | 3/2018 | Bao | G02B 27/017 |
| 2019/0129208 | A1 | 5/2019 | Wei | |
| 2020/0186688 | A1* | 6/2020 | Chen | H04N 23/54 |

FOREIGN PATENT DOCUMENTS

| | | | |
|---|---|---|---|
| CN | 105027184 | A | 11/2015 |
| CN | 107742492 | A | 2/2018 |
| CN | 209417513 | U | 9/2019 |
| CN | 110727109 | A | 1/2020 |
| CN | 111077679 | A | 4/2020 |
| CN | 111123513 | A | 5/2020 |
| CN | 111624808 | A | 9/2020 |
| IN | 110286509 | A | 9/2019 |
| JP | 2014174424 | A | 9/2014 |
| JP | 2016170306 | A | 9/2016 |
| JP | 2017090617 | A * | 5/2017 |
| JP | 2017090617 | A | 5/2017 |
| KR | 1020100094065 | A | 8/2010 |
| WO | 2017173289 | A2 | 10/2017 |

* cited by examiner

TRANSPARENT DISPLAY PANEL AND CONTROL METHOD AND APPARATUS THEREFOR, DISPLAY APPARATUS, AND DISPLAY SYSTEM

CROSS REFERENCE TO RELATED APPLICATIONS

This application is a U.S. National Phase of International Application No. PCT/CN2021/093248, filed on May 12, 2021, and claims priority to Chinese patent application No. 202010611244.9 filed on Jun. 30, 2020, the disclosures of both of which are hereby incorporated by reference in their entirety.

TECHNICAL FIELD

The disclosure relates to the field of display technology, and in particular, to a transparent display panel and a control method and a control device thereof, a display device and a display system.

BACKGROUND

With the development of information technology, transparent display technology is attracting more and more attention. In the related art, a user can view not only the contents displayed on a transparent display screen but also the scenery located behind the transparent display screen through the transparent display screen.

SUMMARY

According to a first aspect of embodiments of the present disclosure, there is provided a transparent display panel comprising: a liquid crystal panel; and a transflective optical film layer disposed on one side of the liquid crystal panel, wherein a plurality of microstructures used for scattering incident light are disposed in the transflective optical film layer, thereby presenting a projected image.

In some embodiments, the liquid crystal panel comprises: a first array substrate and a second array substrate disposed to be opposite to each other; a liquid crystal layer disposed between the first array substrate and the second array substrate; a first driving electrode disposed on one side of the first array substrate close to the liquid crystal layer; a second driving electrode disposed on one side of the second array substrate close to the liquid crystal layer; a first polarizer disposed on one side of the first array substrate far away from the liquid crystal layer; and a second polarizer disposed on one side of the second array substrate far away from the liquid crystal layer.

In some embodiments, the first driving electrode and the second driving electrode are respectively a single plate-shaped electrode, and an electric field formed between the first driving electrode and the second driving electrode is used for controlling a light transmittance grade of the liquid crystal panel.

In some embodiments, the first driving electrode comprises a plurality of first driving sub-electrodes, the second driving electrode is a single plate-shaped electrode, wherein the projected image is divided into a plurality of first areas according to a preset rule, and the plurality of first driving sub-electrodes are divided into a plurality of sub-electrode portions which are in one-to-one correspondence with the plurality of first areas; and an electric field formed between each sub-electrode portion and the second driving electrode is used for controlling the light transmittance grade of a corresponding area in the liquid crystal panel.

In some embodiments, the liquid crystal panel further comprises: a color film layer disposed between the second polarizer and the second array substrate, wherein the color film layer does not comprise a color resist layer.

According to a second aspect of the embodiments of the present disclosure, there is provided a control method of a transparent display panel, wherein the transparent display panel comprise a liquid crystal panel and a transflective optical film layer disposed on one side of the liquid crystal panel, wherein a plurality of microstructures used for scattering incident light are disposed in the transflective optical film layer, thereby presenting a projected image, the control method of the transparent display panel comprising: receiving a transparency level indicating information of the transparent display panel; determining a light transmittance grade of the liquid crystal panel in the transparent display panel according to the transparency level indicating information of the transparent display panel; and controlling a voltage applied to a first driving electrode and a voltage applied to a second driving electrode in the transparent display panel to control the light transmittance grade of the liquid crystal panel.

In some embodiments, the transparency level of the transparent display panel is determined by an intensity of ambient light.

In some embodiments, the transparency level of the transparent display panel decreases with the increase of the intensity of ambient light.

In some embodiments, the transparency level indicating information of the transparent display panel comprises an area transparency level indicating information corresponding to a projected image, and the determining a light transmittance grade of the liquid crystal panel in the transparent display panel according to the transparency level indicating information of the transparent display panel comprises: dividing the projected image into a plurality of first areas according to a preset rule; determining a transparency level of each first area of the plurality of first areas; and determining a light transmittance grade of each second area in the liquid crystal panel according to the transparency level of the each first area, wherein the liquid crystal panel comprises a plurality of second areas which are in one-to-one correspondence with the plurality of first areas.

In some embodiments, the controlling a voltage applied to a first driving electrode and a voltage applied to a second driving electrode in the transparent display panel comprises: controlling a voltage applied to each first driving sub-electrode in the first driving electrode and the voltage applied to the second driving electrode in the transparent display panel to control the light transmittance grade of the second areas in the liquid crystal panel.

In some embodiments, the determining the transparency level of each first area of the plurality of first areas comprises: determining a grayscale mean value of the projected image in the each first area; and taking a product of the grayscale mean value in the each first area and a preset coefficient as the transparency level of the each first area, wherein the preset coefficient is determined by the light transmittance of a transflective optical film layer in the transparent display panel.

In some embodiments, the determining the transparency level of each first area of the plurality of first areas further comprises: detecting whether the grayscale mean value in the each first area is greater than a first threshold after determining the grayscale mean value of the projected image in the each first area; taking the product of the grayscale mean value in the each first area and the preset coefficient as the transparency level of the each first area under a condition that the grayscale mean value in the each first area is not greater than the first threshold; and taking the product of the first preset value and the preset coefficient as the transparency level of the each first area under a condition that the grayscale mean value in the each first area is greater than the first threshold.

In some embodiments, the determining the transparency level of each first area of the plurality of first areas further comprises: detecting whether the grayscale mean value in the each first area is smaller than a second threshold under a condition that the grayscale mean value in the each first area is not greater than the first threshold, wherein the second threshold is smaller than the first threshold; taking the product of the grayscale mean value in the each first area and the preset coefficient as the transparency level of the each first area under a condition that the grayscale mean value in the each first area is not smaller than the second threshold; and taking the product of the second preset value and the preset coefficient as the transparency level of the each first area under a condition that the grayscale mean value in the each first area is smaller than the second threshold.

In some embodiments, the first preset value is the first threshold; and the second preset value is the second threshold.

According to a third aspect of the embodiments of the present disclosure, there is provided a control apparatus of a transparent display panel comprising: a memory configured to store instructions; a processor coupled to the memory, wherein based on the instructions stored in the memory, the processor is configured to: receive a transparency level indicating information of the transparent display panel, wherein the transparent display panel comprise a liquid crystal panel and a transflective optical film layer disposed on one side of the liquid crystal panel, wherein a plurality of microstructures used for scattering incident light are disposed in the transflective optical film layer, thereby presenting a projected image; determine a light transmittance grade of the liquid crystal panel in the transparent display panel according to the transparency level indicating information of the transparent display panel; and control a voltage applied to a first driving electrode and a voltage applied to a second driving electrode in the transparent display panel to control the light transmittance grade of the liquid crystal panel.

According to a fourth aspect of the embodiments of the present disclosure, there is provided a display system comprising a display device comprising: a transparent display panel according to any of the above embodiments; a transparent display panel control device according to any of the above embodiments; and a liquid crystal driving circuit, configured to control a voltage applied to the first driving electrode and a voltage applied to the second driving electrode in the transparent display panel according to the transmittance grade information transmitted by the control apparatus of the transparent display panel to control a transmittance grade of a liquid crystal panel in the transparent display panel.

In some embodiments, further comprising: a source device, configured to transmit data of a projected image to the display device and a projector; and a projector, configured to project the projected image onto a transflective optical film layer in the display device.

According to a fifth aspect of the embodiments of the present disclosure, a non-transitory computer-readable storage medium is provided. The computer-readable storage medium stores computer instructions which, when executed by a processor, implement the method according to any one of the embodiments described above.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which constitute a part of this specification, illustrate embodiments of the disclosure and together with the description, serve to explain the principles of the disclosure.

The present disclosure may be more clearly understood from the following detailed description taken in conjunction with the accompanying drawings, in which.

Figure 1:
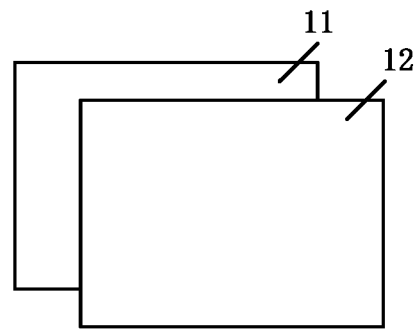
FIG. 1 is a schematic structural diagram of a transparent display panel according to one embodiment of the present disclosure.

It should be understood that the dimensions of the various parts shown in the drawings are not drawn to scale. Further, the same or similar reference signs denote the same or similar components.

DETAILED DESCRIPTION

Various exemplary embodiments of the present disclosure will now be described in detail with reference to the accompanying drawings. The description of the exemplary embodiments is merely illustrative and is in no way intended to limit the disclosure, its application, or uses. The present disclosure may be embodied in many different forms and is not limited to the embodiments described herein. These embodiments are provided so that this disclosure will be thorough and complete, and will fully convey the scope of the disclosure to those skilled in the art. It should be noted that: the relative arrangement of parts and steps, the composition of materials and values set forth in these embodiments are to be construed as illustrative only and not as limiting unless otherwise specifically stated.

The use of "first", "second", and similar words in this disclosure is not intended to indicate any order, quantity, or importance, but rather is used to distinguish one element from another. The word "comprising" or "comprises", and the like, means that the element preceding the word comprises the element listed after the word, and does not exclude the possibility that other elements may also be included.

All terms (including technical or scientific terms) used herein have the same meaning as commonly understood by one of ordinary skill in the art to which this disclosure belongs unless specifically defined otherwise. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Techniques, methods, and apparatus known to one of ordinary skill in the relevant art may not be discussed in detail but are intended to be part of the specification where appropriate.

The inventors have found through research that in the related art, a transparent display screen mainly adopts a liquid crystal display screen. Since the light transmittance of the liquid crystal display is not high, user experience is reduced.

Accordingly, the present disclosure provides a scheme for implementing transparent display by performing projection on a liquid crystal panel.

FIG. 1 is a schematic structural diagram of a transparent display panel according to one embodiment of the disclosure. As shown in FIG. 1, the transparent display panel comprises a liquid crystal panel 11 and a transflective optical film layer 12 disposed at one side of the liquid crystal panel 11. A plurality of microstructures used for scattering incident light are disposed in the transflective optical film layer 12.

Figure 2:
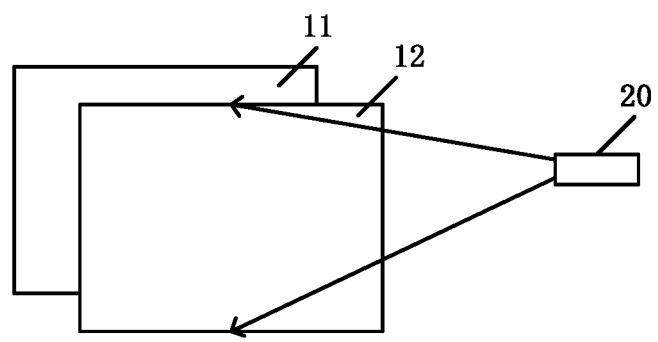
FIG. 2 is a schematic diagram of a transparent display panel presenting a projected image according to one embodiment of the present disclosure.

FIG. 2 is a schematic diagram of a transparent display panel presenting a projected image according to one embodiment of the present disclosure. As shown in FIG. 2, in a case where the projector 20 projects an image onto the transflective optical film layer 12, the light incident on the transflective optical film layer 12 is scattered due to the existence of the microstructures, so that the projected image can be realized on the transflective optical film layer 12.

Figure 3:
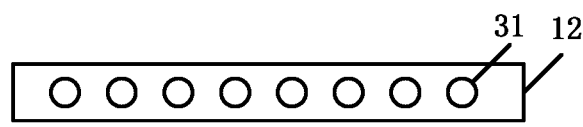
FIG. 3 is a schematic structural diagram of a transflective optical film layer according to one embodiment of the present disclosure.

FIG. 3 is a schematic structural view of a transflective optical film layer according to one embodiment of the present disclosure. As shown in FIG. 3, in the transflective optical film layer 12, the microstructures 31 protrude in a direction away from the liquid crystal panel 11.

In some embodiments, the shape of microstructures 31 comprises a hemisphere, a sphere, a hemi-ellipsoid, an ellipsoid, or other suitable shape.

In some embodiments, the size of microstructures 31 is much smaller than the wavelength of the incident light. The size of the microstructures 31 is, for example, one tenth of the wavelength of the incident light.

In some embodiments, the microstructures 31 are uniformly distributed in the transflective optical film layer 12 for better imaging.

Figure 4:
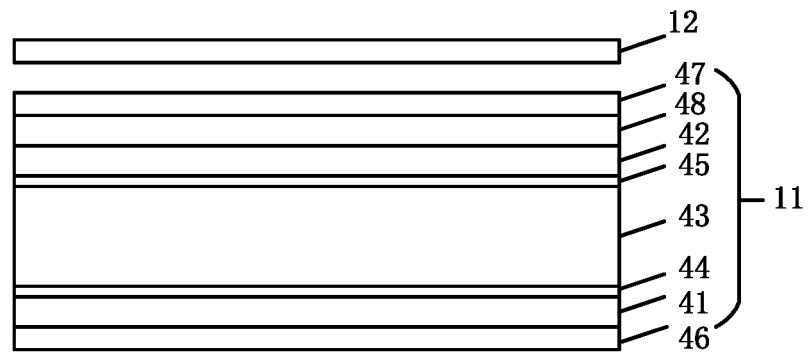
FIG. 4 is a schematic structural diagram of a transparent display panel according to another embodiment of the present disclosure.

FIG. 4 is a schematic structural diagram of a transparent display panel according to another embodiment of the disclosure.

As shown in FIG. 4, the liquid crystal panel 11 comprises a first array substrate 41 and a second array substrate 42 which are disposed be opposite to each other. The liquid crystal layer 43 is disposed between the first array substrate 41 and the second array substrate 42. The first driving electrode 44 is disposed on one side of the first array substrate 41 close to the liquid crystal layer 43, and the second driving electrode 45 is disposed on one side of the second array substrate 42 close to the liquid crystal layer 43. The first polarizer 46 is disposed on one side of the first array substrate 41 away from the liquid crystal layer 43, and the second polarizer 47 is disposed on one side of the second array substrate 42 away from the liquid crystal layer 43.

Figure 5:
FIG. 5 is a top view of a first driving electrode of one embodiment of the present disclosure.

FIG. 5 is a top view of a first driving electrode of one embodiment of the present disclosure. As shown in FIG. 5, the first driving electrode 44 is a single plate-shaped electrode. Accordingly, the second driving electrode 45 is also a single plate-like electrode. The electric field formed between the first driving electrode 44 and the second driving electrode is used to control the deflection direction of the liquid crystal molecules in the liquid crystal layer 43 as a whole, thereby controlling the light transmittance grade of the liquid crystal panel 11.

Figure 6:
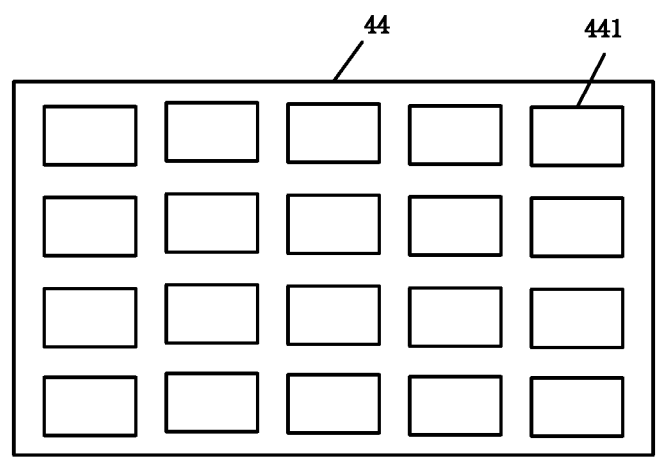
FIG. 6 is a top view of a first driving electrode according to another embodiment of the present disclosure.

FIG. 6 is a top view of a first driving electrode according to another embodiment of the present disclosure. As shown in FIG. 6, the first driving electrode 44 comprises a plurality of first driving sub-electrodes 441. The second driving electrode 45 is still a single plate-like electrode.

It should be noted here that the projected image presented on the transflective optical film layer 12 is divided into a plurality of first areas according to a preset rule, and the plurality of first drive sub-electrodes are divided into a plurality of sub-electrode portions in one-to-one correspondence with the plurality of first regions. The electric field formed between each sub-electrode portion and the second driving electrode is used to control the deflection direction of the liquid crystal molecules in the corresponding area of the liquid crystal layer 43, thereby controlling the transmittance grade of the corresponding area of the liquid crystal panel 11.

In some embodiments, the preset rule is to divide the projected image into a plurality of first areas according to the grayscale of the pixels in the projected image, thereby ensuring the grayscale of the pixels in each area to be similar.

In some embodiments, as shown in FIG. 4, the liquid crystal panel 11 further comprises a color film layer 48 disposed between the second polarizer 47 and the second array substrate 42. The color film layer 48 does not include a color resist layer. Since the color film layer 48 does not include a color resist layer, the transmittance of the liquid crystal panel 11 can be improved while the liquid crystal panel 11 performs color display.

In the transparent display panel provided by the above-mentioned embodiments of the present disclosure, a transparent display panel is disposed on one side of the liquid crystal panel. The image is projected onto the transflective optical film layer by using a projector to realize imaging, thereby realizing transparent display.

Figure 7:
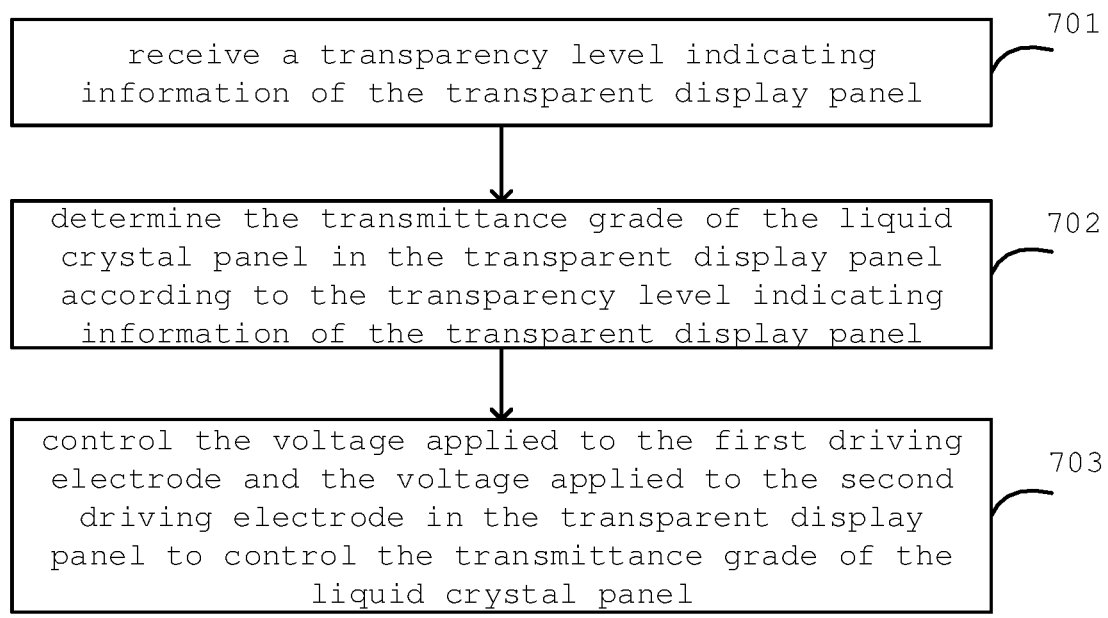
FIG. 7 is a flowchart illustrating a control method of a transparent display panel according to one embodiment of the present disclosure.

FIG. 7 is a flowchart illustrating a control method of the transparent display panel according to one embodiment of the present disclosure. In some embodiments, the transparent display panel is the transparent display panel according to any one of the embodiments of FIGS. 1 to 6. The following control method of the transparent display panel is performed by the control apparatus of the transparent display panel.

In step 701, a transparency level indicating information of the transparent display panel is received.

In some embodiments, the transparency level of the transparent display panel is determined by the ambient light intensity. The transparency level of the transparent display panel decreases with the increase of the intensity of ambient light.

For example, under a condition that the intensity of ambient light is strong, the transmittance of the liquid crystal panel is low. In this case, the transmittance of the liquid crystal panel can be effectively improved by reducing the transparency level of the transparent display panel. Under a condition that the intensity of ambient light is weak, the transmittance of the liquid crystal panel is high. In this case, the light transmittance of the liquid crystal panel can be effectively reduced by increasing the transparency level of the transparent display panel, thereby effectively improving the viewing experience of the user.

In step 702, the transmittance grade of the liquid crystal panel in the transparent display panel is determined according to the transparency level indicating information of the transparent display panel.

In step 703, the voltage applied to the first driving electrode and the voltage applied to the second driving electrode in the transparent display panel are controlled to control the transmittance grade of the liquid crystal panel.

In some embodiments, the liquid crystal panel has 256 transmittance grades, i.e., from 0 to 255. Under a condition that the transparency level indicating information is used for indicating that the transparency of the transparent display panel is 80%, the transparency level indicating information is converted into a corresponding light transmittance grade. And then the light transmittance grade is sent to the liquid crystal drive circuit in the transparent display panel so as to control the voltage of the first driving electrode and the voltage of the second driving electrode in the liquid crystal panel, thereby controlling the light transmittance grade of the liquid crystal panel.

It shall be noted here that if the transmittance grade is 255, the liquid crystal layer in the liquid crystal panel is in a fully-on state, and the transparency of the liquid crystal panel is the highest. At this moment, the user can see the scenery behind the liquid crystal panel while watching the projected image. The contrast of the projected image is now the worst due to the transparency.

If the transmittance grade is 0, the liquid crystal layer in the liquid crystal panel is in a completely closed state, and the transparency of the liquid crystal panel is the lowest. At this time, the user cannot see the scenery behind the liquid crystal panel while watching the projected image. The contrast of the projected image is best at this time.

That is to say, through adjusting the light transmittance grade, the light transmittance of the liquid crystal display panel and the contrast of projecting image can be adjusted to promote the experience that the user watched the projecting image.

Figure 8:
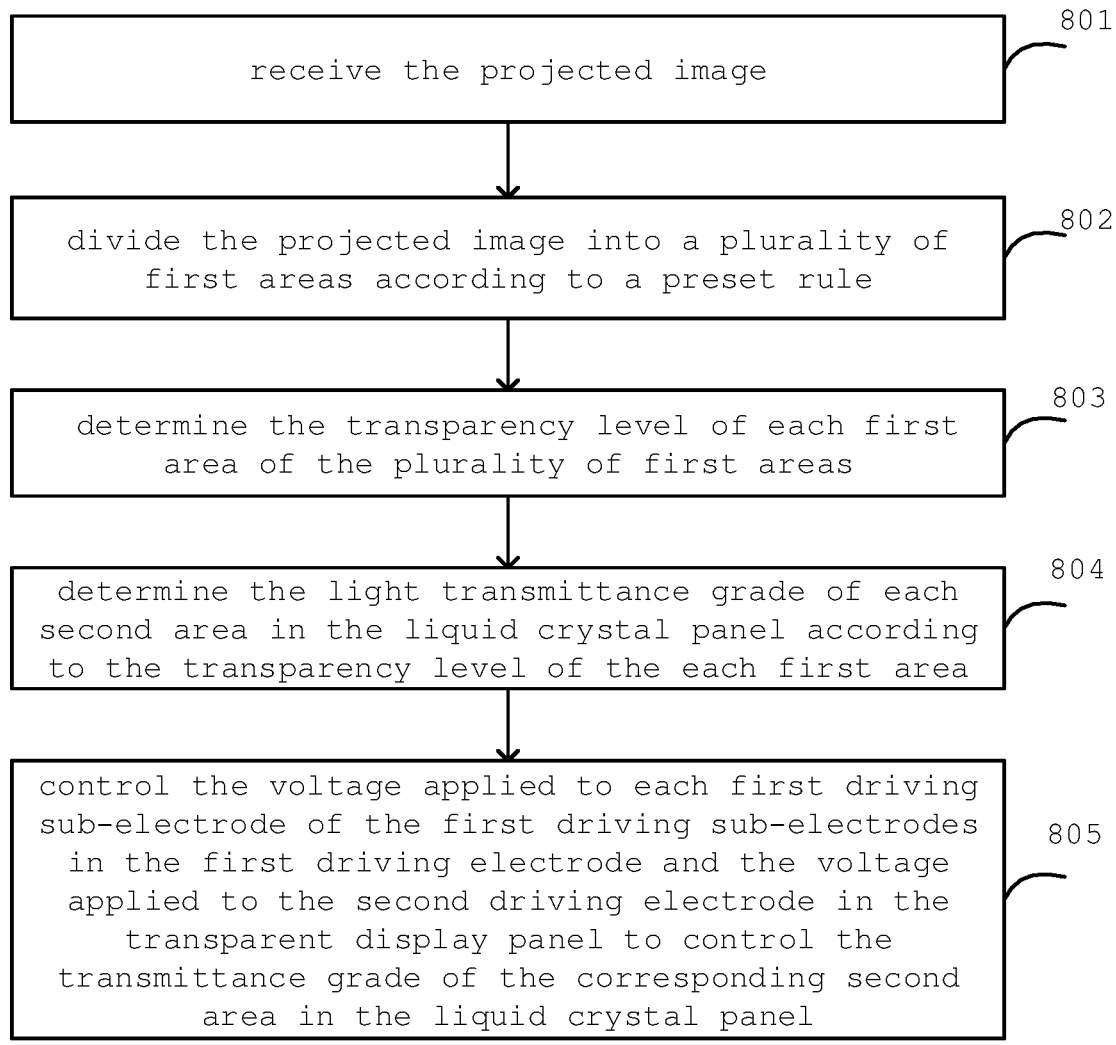
FIG. 8 is a flowchart illustrating a control method of a transparent display panel according to another embodiment of the present disclosure.

FIG. 8 is a flowchart illustrating a transparent display panel control method according to another embodiment of the present disclosure. FIG. 8 is different from FIG. 7 in that, in the embodiment shown in FIG. 8, the transparency level indicating information comprises an area transparency level indicating information corresponding to the projected image.

In step 801, the projected image is received.

It should be noted that the received projected image is an image projected by the projector onto the transflective optical film layer in the transparent display panel.

In step 802, the projected image is divided into a plurality of first areas according to a preset rule.

In some embodiments, the projected image is divided into a plurality of first areas according to the grayscale of the pixels in the projected image, thereby ensuring the grayscale of the pixels in each area to be similar. Accordingly, a plurality of second areas are divided on the liquid crystal panel. The plurality of first areas are in one-to-one correspondence with the plurality of second areas.

At step 803, the transparency level of each first area of the plurality of first areas is determined.

In some embodiments, the grayscale mean value of the projected image in the each first area is determined. The product of the grayscale mean value in the each first area and a preset coefficient is taken as the transparency level of the each first area. The preset coefficient is determined by the light transmittance of a transflective optical film layer in the transparent display panel.

In some embodiments, It is detected whether the grayscale mean value in the each first area is greater than a first threshold after determining the grayscale mean value of the projected image in the each first area. The product of the grayscale mean value in the each first area and the preset coefficient is taken as the transparency level of the each first area under a condition that the grayscale mean value in the each first area is not greater than the first threshold. Otherwise, the product of the first preset value and the preset coefficient is taken as the transparency level of the each first area.

For example, the first threshold is set to be 200. If the grayscale mean value in a first area is 180, the product of the grayscale mean value and a preset coefficient is taken as the transparency level of the first area. If the grayscale mean value in the first area is 230, the product of the first preset value and the preset coefficient is taken as the transparency level of each first area, so as to avoid the influence on the display of the projected image due to the overlarge grayscale mean value in the first area. For example, the first preset value is a first threshold.

In some embodiments, it is detected whether the grayscale mean value in the each first area is smaller than a second threshold under a condition that the grayscale mean value in the each first area is not greater than the first threshold, wherein the second threshold is smaller than the first threshold. The product of the grayscale mean value in the each first area and the preset coefficient is taken as the transparency level of the each first area under a condition that the grayscale mean value in the each first area is not smaller than the second threshold. Otherwise, the product of the second preset value and the preset coefficient as the transparency level of the each first area.

For example, the second threshold is set to be 50. If the grayscale mean value in a first area is 80, the product of the grayscale mean value and a preset coefficient is taken as the transparency level of the first area. If the grayscale mean value in the first region is 30, the product of the second preset value and the preset coefficient is taken as the transparency level of the first area, so as to avoid the influence on the display of the projected image caused by the too-small grayscale mean value of the first area. For example, the second preset value is a second threshold.

In step 804, the light transmittance grade of each second area in the liquid crystal panel is determined according to the transparency level of the each first area.

In step 805, the voltage applied to each first driving sub-electrode of the first driving sub-electrodes in the first driving electrode and the voltage applied to the second driving electrode in the transparent display panel are controlled to control the transmittance grade of the corresponding second area in the liquid crystal panel.

It should be noted here that, by presenting the projected image on the transflective optical film layer in the transparent display panel and matching the transparency level of each second area in the transparent display panel with the transparency level of the corresponding area of the projected image, the projection display effect is effectively improved.

Figure 9:
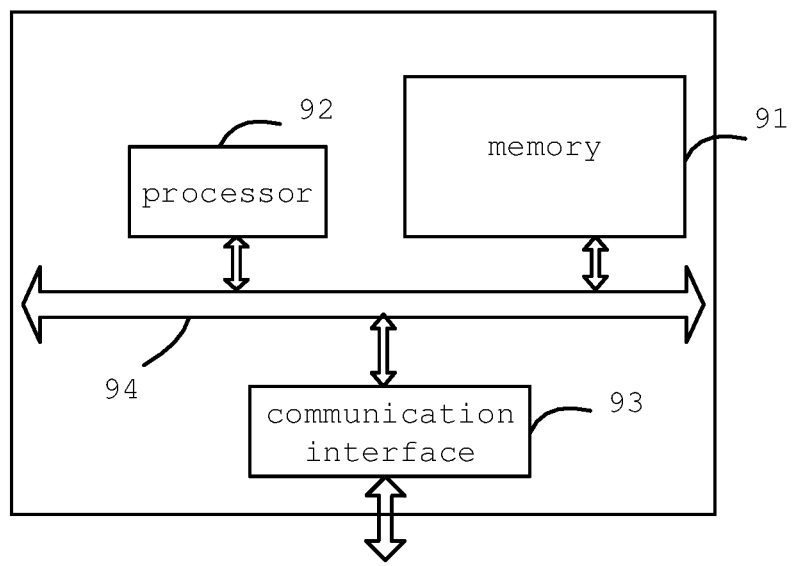
FIG. 9 is a schematic structural diagram of a control apparatus of a transparent display panel according to one embodiment of the present disclosure.

FIG. 9 is a schematic structural diagram of a control apparatus of the transparent display panel according to one embodiment of the disclosure. As shown in FIG. 9, the transparent display panel control device comprises a memory 91 and a processor 92.

The memory 91 is used to store instructions. The processor 92 is coupled to the memory 91. The processor 92 is configured to perform a method as referred to in either of the embodiments of FIG. 7 or FIG. 8 based on instructions stored in the memory.

As shown in FIG. 9, the control apparatus of the transparent display panel further comprises a communication interface 93 for information interaction with other devices. Meanwhile, the control apparatus of the transparent display panel further comprises a bus 94, and the processor 92, the communication interface 93 and the memory 91 are communicated with each other through the bus 94.

The Memory 91 may comprised a Random Access Memory (RAM), and may also comprises a Non-Volatile Memory (NVM), such as at least one disk memory. The memory 91 may also be a memory array. The storage 91 may also be partitioned into blocks and the blocks may be combined into virtual volumes according to certain rules.

Further, the processor 92 may be a central processing unit, or may be an ASIC (Application Specific Integrated Circuit), or one or more Integrated circuits configured to implement embodiments of the present disclosure.

In some embodiments, the control apparatus of the transparent display panel may be set in a SoC (System on Chip) board, an FPGA (Field-Programmable Gate Array) board, or a GPU (Graphics Processing Unit).

The present disclosure also provides a non-transitory computer-readable storage medium. The computer readable storage medium stores computer instructions which, when executed by the processor, implement the method according to any one of FIG. 7 or FIG. 8.

Figure 10:
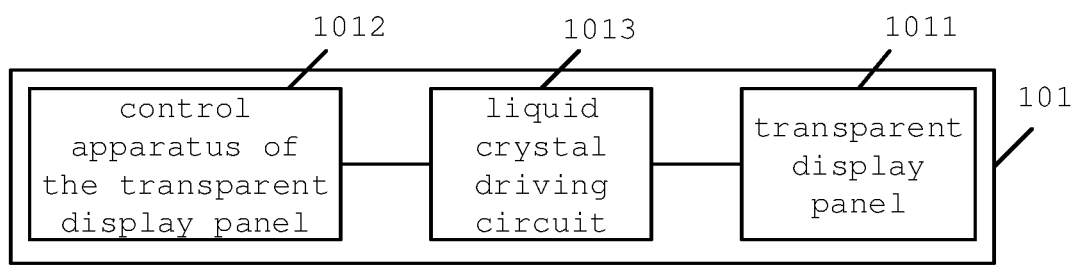
FIG. 10 is a schematic structural diagram of a display system according to one embodiment of the present disclosure.

FIG. 10 is a schematic structural diagram of a display system according to one embodiment of the present disclosure. As shown in FIG. 10, the display system comprises a display device 101. The display device 101 comprises a transparent display panel 1011, a control apparatus of the transparent display panel 1012, and a liquid crystal drive circuit 1013. The transparent display panel 1011 is the transparent display panel according to any one of the embodiments of FIGS. 1 to 6. The control apparatus of the transparent display panel 1012 is the transparent display panel control device according to any one of the embodiments of FIG. 9.

The liquid crystal driving circuit 1013 controls the voltage applied to the first driving electrode and the voltage applied to the second driving electrode in the transparent display panel 1011 according to the light transmittance grade information transmitted by the control apparatus of the transparent display panel 1012 to control the light transmittance grade of the liquid crystal panel in the transparent display panel 1011.

In some embodiments, the display device may be any product or component having a display function, such as a display, a mobile phone, a tablet computer, a television, a laptop computer, a digital photo frame, a navigator, a transparent display window, a showcase, a display board, a transparent billboard, a vehicle window, and the like.

Figure 11:
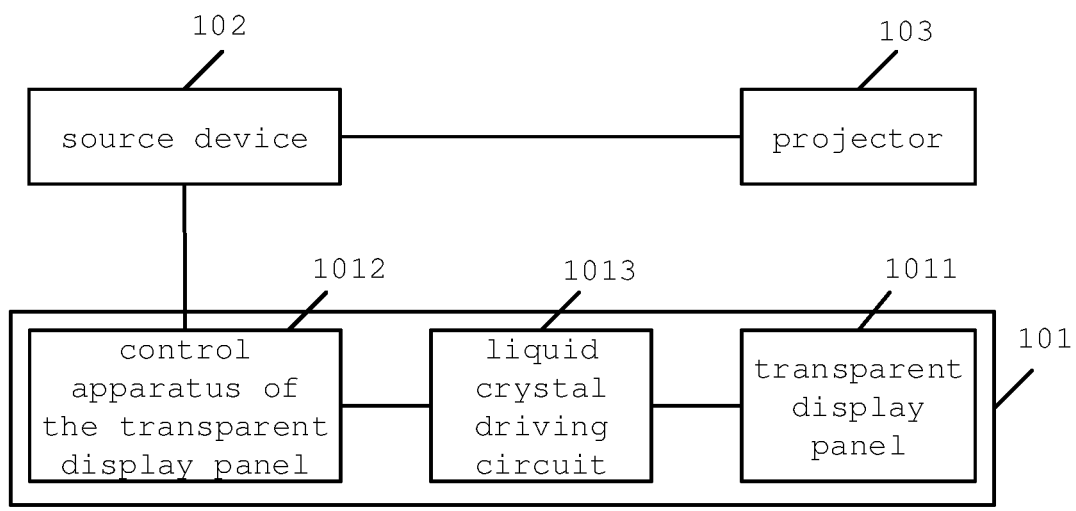
FIG. 11 is a schematic structural diagram of a display system according to another embodiment of the present disclosure.

FIG. 11 is a schematic structural diagram of a display system according to another embodiment of the present disclosure. FIG. 11 differs from FIG. 10 in that, in the embodiment shown in FIG. 11, the display system comprises a source device 102 and a projector 103 in addition to the display device 101.

The source device 102 transmits data of the projected image to the display device 101 and the projector 103.

In some embodiments, the source device 102 can be a server, a computer, a cell phone, a tablet, a media player, etc. capable of transmitting a projected image.

The projector 103 projects the received projection image onto the transflective optical film layer in the transparent display panel 1011.

Accordingly, the user can see the projected image through the transflective optical film layer, and the transparency level in different areas of the liquid crystal panel in the transparent display panel 1011 match with the transparency level of the corresponding areas of the projected image to effectively improve the projection display effect.

So far, embodiments of the present disclosure have been described in detail. Some details well known in the art are not described in order to avoid obscuring the concepts of the present disclosure. Those skilled in the art can now fully understand how to implement the teachings disclosed herein, in view of the foregoing description.

Although some specific embodiments of the present disclosure have been described in detail by way of example, it should be understood by those skilled in the art that the above examples are for illustration only and are not intended to limit the scope of the present disclosure. It will be understood by those skilled in the art that various changes may be made and equivalents may be substituted for elements thereof without departing from the scope and spirit of the present disclosure. The scope of the present disclosure is defined by the appended claims.

What is claimed is:

1. A control method of a transparent display panel, wherein the transparent display panel comprise a liquid crystal panel and a transflective optical film layer disposed on one side of the liquid crystal panel, wherein a plurality of microstructures used for scattering incident light are disposed in the transflective optical film layer, thereby presenting a projected image, the control method of the transparent display panel comprising:

receiving a transparency level indicating information of the transparent display panel, wherein the transparency level indicating information of the transparent display panel comprises an area transparency level indicating information corresponding to a projected image;

determining a light transmittance grade of the liquid crystal panel in the transparent display panel according to the transparency level indicating information of the transparent display panel, comprising:

dividing the projected image into a plurality of first areas according to a preset rule, determining a transparency level of each first area of the plurality of first areas, comprising:

determining a grayscale mean value of the projected image in the each first area; and taking a product of the grayscale mean value in the each first area and a preset coefficient as the transparency level of the each first area, wherein the preset coefficient is determined by the light transmittance of a transflective optical film layer in the transparent display panel;

determining a light transmittance grade of each second area in the liquid crystal panel according to the transparency level of the each first area, wherein the liquid crystal panel comprises a plurality of second areas which are in one-to-one correspondence with the plurality of first areas; and controlling a voltage applied to a first driving electrode and a voltage applied to a second driving electrode in the transparent display panel to control the light transmittance grade of the liquid crystal panel.

2. The control method according to claim 1, wherein the transparency level of the transparent display panel is determined by an intensity of ambient light.

3. The control method according to claim 2, wherein the transparency level of the transparent display panel decreases with the increase of the intensity of ambient light.

4. The control method according to claim 1, wherein the controlling a voltage applied to a first driving electrode and a voltage applied to a second driving electrode in the transparent display panel comprises:

controlling a voltage applied to each first driving sub-electrode in the first driving electrode and the voltage applied to the second driving electrode in the transparent display panel to control the light transmittance grade of the second areas in the liquid crystal panel.

5. The control method according to claim 1, wherein the determining the transparency level of each first area of the plurality of first areas further comprises:

detecting whether the grayscale mean value in the each first area is greater than a first threshold after determining the grayscale mean value of the projected image in the each first area;

taking the product of the grayscale mean value in the each first area and the preset coefficient as the transparency level of the each first area under a condition that the grayscale mean value in the each first area is not greater than the first threshold; and taking the product of a first preset value and the preset coefficient as the transparency level of the each first area under a condition that the grayscale mean value in the each first area is greater than the first threshold.

6. The control method according to claim 5, wherein the determining the transparency level of each first area of the plurality of first areas further comprises:

detecting whether the grayscale mean value in the each first area is smaller than a second threshold under a condition that the grayscale mean value in the each first area is not greater than the first threshold, wherein the second threshold is smaller than the first threshold;

taking the product of the grayscale mean value in the each first area and the preset coefficient as the transparency level of the each first area under a condition that the grayscale mean value in the each first area is not smaller than the second threshold; and taking the product of a second preset value and the preset coefficient as the transparency level of the each first area under a condition that the grayscale mean value in the each first area is smaller than the second threshold.

7. The control method according to claim 6, wherein:
the first preset value is the first threshold; and
the second preset value is the second threshold.

8. A non-transitory computer readable storage medium storing computer instructions which, when executed by a processor, implement the method of claim 1.

9. A control apparatus of a transparent display panel, comprising:

a memory configured to store instructions;
a processor coupled to the memory, wherein based on the instructions stored in the memory, the processor is configured to perform operations comprising:

receiving a transparency level indicating information of the transparent display panel, wherein the transparent display panel comprise a liquid crystal panel and a transflective optical film layer disposed on one side of the liquid crystal panel, wherein a plurality of microstructures used for scattering incident light are disposed in the transflective optical film layer, thereby presenting a projected image, and the transparency level indicating information of the transparent display panel comprises an area transparency level indicating information corresponding to a projected image;

determining a light transmittance grade of the liquid crystal panel in the transparent display panel according to the transparency level indicating information of the transparent display panel, comprising:

dividing the projected image into a plurality of first areas according to a preset rule;

determining a transparency level of each first area of the plurality of first areas, comprising:

determining a grayscale mean value of the projected image in the each first area; and taking a product of the grayscale mean value in the each first area and a preset coefficient as the transparency level of the each first area, wherein the preset coefficient is determined by the light transmittance of a transflective optical film layer in the transparent display panel; and determining a light transmittance grade of each second area in the liquid crystal panel according to the transparency level of the each first area, wherein the liquid crystal panel comprises a plurality of second areas which are in one-to-one correspondence with the plurality of first areas; and controlling a voltage applied to a first driving electrode and a voltage applied to a second driving electrode in the transparent display panel to control the light transmittance grade of the liquid crystal panel.

10. A display system, comprising a display device, the display device comprising:

a transparent display panel, comprising:
a liquid crystal panel; and
a transflective optical film layer disposed on one side of the liquid crystal panel, wherein a plurality of microstructures used for scattering incident light are disposed in the transflective optical film layer, thereby presenting a projected image; and a control apparatus of the transparent display panel comprising:

a memory configured to store instructions;
a processor coupled to the memory, wherein based on the instructions stored in the memory, the processor is configured to perform operations comprising:

receiving a transparency level indicating information of the transparent display panel, wherein the transparency level indicating information of the transparent display panel comprises an area transparency level indicating information corresponding to a projected image;

determining a light transmittance grade of the liquid crystal panel in the transparent display panel according to the transparency level indicating information of the transparent display panel, comprising:

dividing the projected image into a plurality of first areas according to a preset rule;

determining a transparency level of each first area of the plurality of first areas, comprising:

determining a grayscale mean value of the projected image in the each first area; and taking a product of the grayscale mean value in the each first area and a preset coefficient as the transparency level of the each first area, wherein the preset coefficient is determined by the light transmittance of a transflective optical film layer in the transparent display panel; and determining a light transmittance grade of each second area in the liquid crystal panel according to the transparency level of the each first area, wherein the liquid crystal panel comprises a plurality of second areas which are in one-to-one correspondence with the plurality of first areas; and controlling a voltage applied to a first driving electrode and a voltage applied to a second driving electrode in the transparent display panel to control the light transmittance grade of the liquid crystal panel; and a liquid crystal driving circuit, configured to control a voltage applied to the first driving electrode and a voltage applied to the second driving electrode in the transparent display panel according to the transmittance grade information transmitted by the control apparatus of the transparent display panel to control a transmittance grade of a liquid crystal panel in the transparent display panel.

11. The display system according to claim 10, further comprising:

a source device, configured to transmit data of a projected image to the display device and a projector;

a projector, configured to project the projected image onto a transflective optical film layer in the display device.

12. The display system according to claim 10, wherein the liquid crystal panel comprises:

a first array substrate and a second array substrate disposed to be opposite to each other;

a liquid crystal layer disposed between the first array substrate and the second array substrate;

a first driving electrode disposed on one side of the first array substrate close to the liquid crystal layer;

a second driving electrode disposed on one side of the second array substrate close to the liquid crystal layer;

a first polarizer disposed on one side of the first array substrate far away from the liquid crystal layer; and a second polarizer disposed on one side of the second array substrate far away from the liquid crystal layer.

13. The display system according to claim 12, wherein the first driving electrode and the second driving electrode are respectively a single plate-shaped electrode, and an electric field formed between the first driving electrode and the second driving electrode is used for controlling a light transmittance grade of the liquid crystal panel.

14. The display system according to claim 12, wherein:

the first driving electrode comprises a plurality of first driving sub-electrodes, the second driving electrode is a single plate-shaped electrode, wherein the projected image is divided into a plurality of first areas according to a preset rule, and the plurality of first driving sub-electrodes are divided into a plurality of sub-electrode portions which are in one-to-one correspondence with the plurality of first areas; and an electric field formed between each sub-electrode portion and the second driving electrode is used for controlling the light transmittance grade of a corresponding area in the liquid crystal panel.

15. The display system according to claim 12, wherein the liquid crystal panel further comprises:

a color film layer disposed between the second polarizer and the second array substrate, wherein the color film layer does not comprise a color resist layer.

* * * * *